2,776,898
CERAMIC DIELECTRIC WITH HIGH DIELECTRIC CONSTANT AND PROCESS OF MAKING THE SAME

Jean Day and Micheline Calis, Paris, France, assignors to Compagnie Generale de Telegraphie Sans Fil, a French corporation No Drawing. Application June 17, 1953, Serial No. 362,412

Claims priority, application France July 1, 1952

3 Claims. (Cl. 106—39)

The present invention relates to ceramic dielectrics of high dielectric constant, more particularly to such ceramics as are characterized by crystalline lattice of the perovskite type.

If certain difficulties now to be pointed out could be overcome, ceramic materials of the foregoing type that have a dielectric constant of several thousand would be particularly worthwhile for the manufacture of electric capacitors.

A ceramic block that has first been baked is much too hard to lend itself readily to subdivision into pieces of the shape and accurate dimensions required for capacitor and other precision dielectrics. On the other hand, dielectric pieces for such use that have been shaped from a paste to predetermined form (such as tubes or thin plates), give rise to technological problems in assuring maintenance after baking of the requisite precision of dimensions and shape. For in the course of baking, these pieces suffer contraction which at times is very substantial and depends on factors unknown to the ceramic manufacturer; such for example as the origin of these components, their physico-chemical state and the heat treatment to which the basic components had been submitted, which may vary from one batch to another, etc.

In the manufacture of tubes and particularly of thin plates, it is important for technological reasons to use pastes that have a very low contraction, a requirement not usually compatible with the desired imperviousness of the baked product, for the greater the contraction the greater the imperviousness.

Such contraction and other objections are particularly disturbing with the procedure described in the application for French patent filed February 2, 1952, for "Procedure for Manufacturing Pieces of Ceramic Material," issued as French Patent No. 1,050,129.

In that procedure there is mixed with the mineral powders an organic binder which has both a thermoplastic and a thermosetting component. The paste thus obtained is brought into sheet form by use of a laminator, the rollers of which are heated to a temperature at which the binders soften. The sheets are cut into little plates which are baked in an oven, the temperature of which should rise sufficiently fast for the little plates to harden without deformation. Piles of the little plates could be introduced into the baking oven without sticking one to the other. This procedure contributes to control of contraction and to excellent utilization of the baking oven with large output. But without the features of the present invention, the dielectric constant may not be as high as desired, especially at ambient temperature or higher as required in many capacitor uses, and the power factor may not be as low as desired for many capacitor uses.

It is among the objects of the invention to provide ceramic dielectric of high dielectric constant, the performance of which can readily be controlled for maximum dielectric constant at ambient temperature or higher or for low power factor in any required frequency range, all depending upon the specifications required for capacitor dielectrics or similar use and with close tolerances, all at relatively low cost without the need for expensive equipment or highly skilled supervisory talent and indeed with high output by resort to simple and more or less conventional oven equipment.

According to the invention, there are produced ceramic pieces that suffer only negligible contraction in the course of the baking and are well vitrified, all by controlling the choice of components and their proportions under definite thermal treatments.

According to the invention, a mixture of barium titanate and strontium titanate proportioned by weight as follows:

| | Parts |
|---|---|
| $BaTiO_3$ | 70 to 98 |
| $SrTiO_3$ | 30 to 2 | is baked to a temperature between 1200° and 1400° C. The resultant product is crushed to a powder, to which is added 1 to 10 parts of powdered cerium oxide per 100 parts of the mix of which a paste is made by adding an organic binder which may have both a thermoplastic and a thermosetting component. As taught in French Patent No. 1,050,129 above referred to, a suitable binder of this type is, for example, polyvinyl chloride and tricresyl phosphate as thermoplastic materials and a phenol-formaldehyde resin as a thermosetting material. The mixture with the oxides may be facilitated by the addition of cyclohexanone. Other suitable organic binders may comprise (as thermoplastics) stearin, cellulose derivatives, polyamides, polystyrene, polyvinylidene, polyvinyl acetate and butyrate, methacrylic resins and silicones; and (as thermosetting materials) phenol plastics, amino plastics, polyesters and certain silicones. The paste is subdivided into pieces of desired form and dimensions and these pieces are then baked at temperature between 1200 and 1400° C.

The paste, regardless of the binder used, is sheeted while hot and little plates such as used for capacitor dielectric for instance, are cut from the sheets thus obtained and such little plates are then introduced into the baking oven.

The resultant product composed of barium titanate, strontium titanate and cerium oxide in the proportions above defined, is well vitrified and quite impervious.

The composition of barium titanate and strontium titanate may be produced from a mixture of powders of titanium oxide, barium carbonate and strontium carbonate in proportions predetermined to obtain the foregoing formulation after baking at a temperature between 1200 and 1400° C.

When it is desired to obtain a product in which the maximum dielectric constant exists at the ambient temperature or higher, the components are used in the following proportions by weight:

| | Parts |
|---|---|
| $BaTiO_3$ | 92 to 97 |
| $SrTiO_3$ | 8 to 3 |

When a product is desired of lowest possible power factor (1 percent or even less), the components are used in the following proportions by weight:

| | Parts |
|---|---|
| $BaTiO_3$ | 75 to 85 |
| $SrTiO_3$ | 25 to 15 |

Where the quality of the product is subject to closest tolerance with the formulations stated in the last two paragraphs, there is also used 3 to 5 parts of cerium oxide for 100 parts by weight of $BaTiO_3$ and $SrTiO_3$.

To make a product, the composition of which is above defined, there may be used a mixture of titanic oxide (TiO$_2$), barium carbonate and strontium carbonate in the suitable proportions above referred to. This mixture is baked at high temperature (between 1200° C. and 1400° C.), and the resultant product is then broken, crushed and screened (screen of 100 mesh per square millimeter or the equivalent).

To that powder, whether prepared from the titanates or by the procedure described in the previous paragraph, there is then added a quantity of cerium oxide predetermined in manner above suggested to provide a composition of definitive formula. The mixture is made as a paste with water in ball mills, both bowl and balls being of porcelain.

The paste thus obtained is then dried, screened and mixed with an organic binder which permits forming by extrusion, by molding or if thin plates are to be made, by sheeting. These pieces are then baked at temperatures between 1200 and 1400° C.

By way of non-limitative examples, the two following specific compositions by weight are desirable:

*Formula 1*

| | |
|---|---:|
| BaTiO$_3$ | 195 |
| SrTiO$_3$ | 15 |
| CeO$_2$ | 2 |

¹ This mixture prepared from very pure products, is baked at 1250° C.

*Formula 2*

| | |
|---|---:|
| BaTiO$_3$ | 182 |
| SrTiO$_3$ | 118 |
| CeO$_2$ | 4 |

¹ This mixture is first baked at 1250° C.

The mixture may be prepared as above set forth from titanium oxide, barium carbonate and strontium carbonate.

The powder formed from prebaked product as above set forth, is mixed with the CeO$_2$, converted to a paste, shaped, formed and then baked, preferably at about 1320° C.

To complete the capacitor from the ceramic dielectric described, two opposed surfaces of said dielectric are silvered by means of a brush with a paint of silver base. This coating is then baked at about 750° C. so that the metallic silver shall adhere firmly to the ceramic to form its electrodes without the intervention of plastic material.

For Formula 1, the dielectric constant is about 4000 at 20° C. with a maximum of 6500 at 50° C. The dielectric losses are of the order of 0.5 percent at one kilocycle and they vary little with temperature.

For Formula 1, the use of pure products is very important, as otherwise the dielectric constant is greatly lowered to the order of one-half the attainable value. It can readily be determined by an X-ray diffraction diagram whether pure components have been used, because these are characterized by a square lattice while with the use of commercial products of ordinary quality, the lattice is cubic.

For Formula 2, the dielectric constant is only about 1500 at 20° C. It reaches a maximum toward minus 30° C. The power factor is very low at 20° C., about 0.2 percent at one kilocycle and even lower, about 0.1 percent at one megacycle.

As many changes could be made in the above product and process, and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. Process of manufacturing a ceramic dielectric product by baking between 1200° and 1400° C. a mixture corresponding to the following components by weight:

| | Parts |
|---|---:|
| BaTiO$_3$ | 70 to 98 |
| SrTiO$_3$ | 30 to 2 | crushing the resultant product to a powder, adding thereto 1 to 10 parts by weight of CeO$_2$ for 100 parts of said product, forming a paste from said resultant mix with an organic binder, shaping the paste into an article of desired form and baking that article at a temperature between 1200° and 1400° C. in oxidizing atmosphere.

2. Process of manufacturing a ceramic dielectric product characterized by maximum dielectric constant at ambient temperature or higher, by baking between 1200° and 1400° C. a mixture corresponding to the following components by weight:

| | Parts |
|---|---:|
| BaTiO$_3$ | 92 to 97 |
| SrTiO$_3$ | 8 to 3 | crushing the resultant product to a powder, adding thereto 1 to 10 parts by weight of CeO$_2$ for 100 parts of said product, forming a paste from said resultant mix with an organic binder, shaping the paste into an article of desired form and baking that article at a temperature between 1200° and 1400° C. in oxidizing atmosphere.

3. Process of manufacturing a ceramic dielectric product, characterized by a minimum power factor, by baking between 1200° and 1400° C. a mixture corresponding to the following components by weight:

| | Parts |
|---|---:|
| BaTiO$_3$ | 75 to 85 |
| SrTiO$_3$ | 25 to 15 | crushing the resultant product to a powder, adding thereto 1 to 10 parts by weight of CeO$_2$ for 100 parts of said product, forming a paste from said resultant mix with an organic binder, shaping the paste into an article of desired form and baking that article at a temperature between 1200° and 1400° C. in oxidizing atmosphere.

References Cited in the file of this patent

UNITED STATES PATENTS

| | | |
|---|---|---|
| 2,443,211 | Wainer | June 15, 1948 |
| 2,520,376 | Roup et al. | Aug. 29, 1950 |
| 2,616,813 | Klasens | Nov. 4, 1952 |